United States Patent
Kozar et al.

(10) Patent No.: US 8,530,027 B2
(45) Date of Patent: Sep. 10, 2013

(54) FIBERS WITH INTERLOCKING SHAPES

(75) Inventors: Michael P. Kozar, Mercer Island, WA (US); Mark S. Wilenski, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 418 days.

(21) Appl. No.: 12/968,535

(22) Filed: Dec. 15, 2010

(65) Prior Publication Data

US 2012/0156418 A1   Jun. 21, 2012

(51) Int. Cl.
  *B32B 3/06* (2006.01)
  *B23P 17/00* (2006.01)
  *D02G 3/22* (2006.01)

(52) U.S. Cl.
  USPC ............ 428/99; 29/419.1; 428/98; 428/105; 428/113; 428/357

(58) Field of Classification Search
  USPC .............................. 428/99, 98, 113, 105, 357
  See application file for complete search history.

(56) References Cited

U.S. PATENT DOCUMENTS

| | | | |
|---|---|---|---|
| 5,665,450 A | 9/1997 | Day et al. | |
| 5,958,804 A | 9/1999 | Brown | |
| 2007/0172677 A1* | 7/2007 | Biermann et al. | ............ 428/469 |
| 2008/0241537 A1 | 10/2008 | Sennett | |

FOREIGN PATENT DOCUMENTS

EP   1908586   4/2008

OTHER PUBLICATIONS

U.S. Appl. No. 12/901,342, "Transparent Composites With Organic Fiber" by Michael Kozar et al. and filed Oct. 8, 2010.
Alcock, "The mechanical properties of unidirectional all-polypropylene composites", Composites Part A: Applied Science and Manufacturing, Elsevier Science Publishers, B. V., Amsterdam, NL, vol. 37, No. 5, May 1, 2006.
International Search Report, PCT/US2011/060062, Mar. 13, 2012.

* cited by examiner

*Primary Examiner* — Brent O'Hern

(57) ABSTRACT

A composite article may comprise a plurality of fibers. Each one of the fibers may have upper, lower and side surfaces. The fibers may be embedded within a matrix. At least one of the upper and lower surfaces of at least one of the fibers may include a notch region and a pair of side regions on opposite sides of the notch region. The plurality of fibers may be arranged in layers. At least one of the fibers of one of the layers may be received within the notch region of at least one of the fibers of another one of the layers.

20 Claims, 7 Drawing Sheets

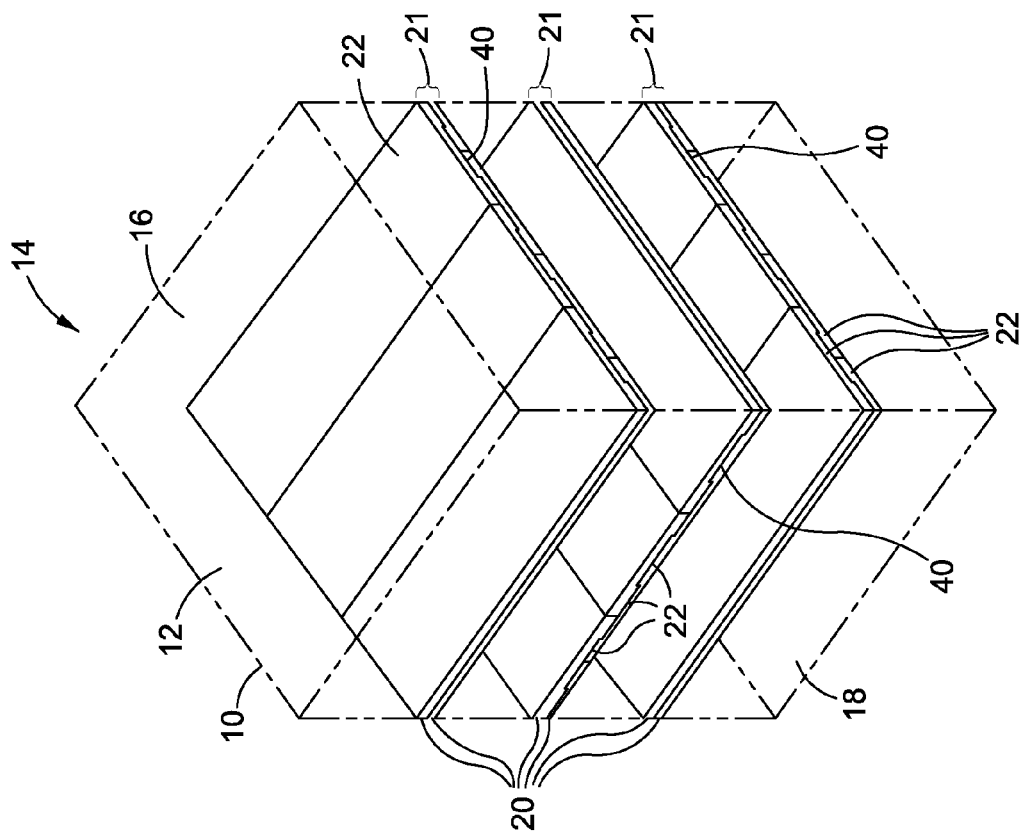
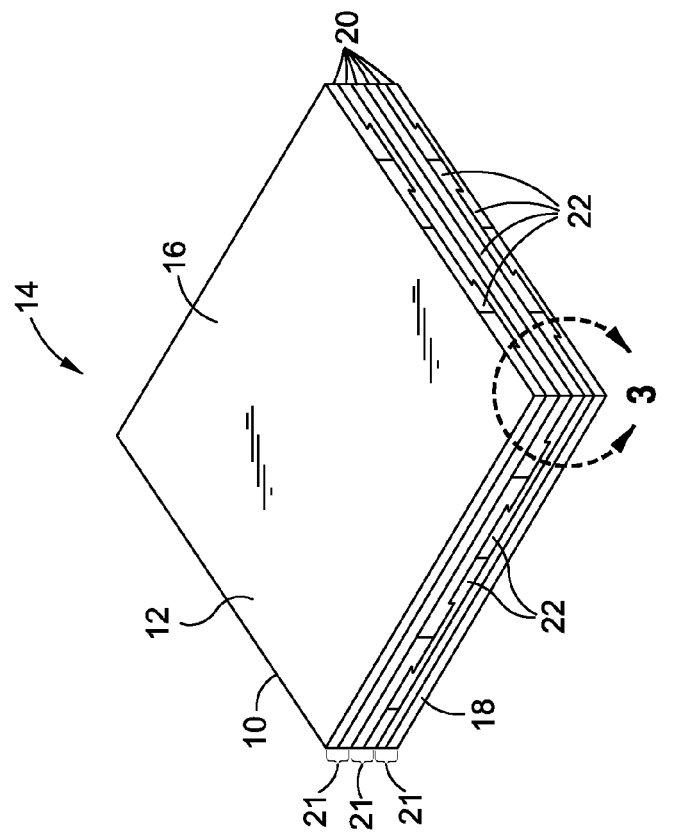
FIG. 2
FIG. 1

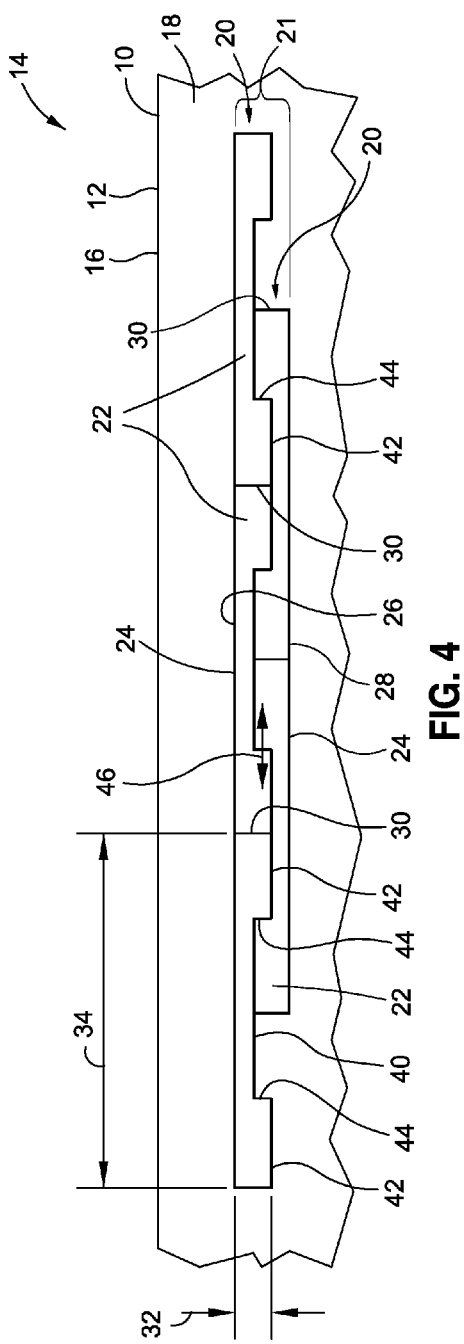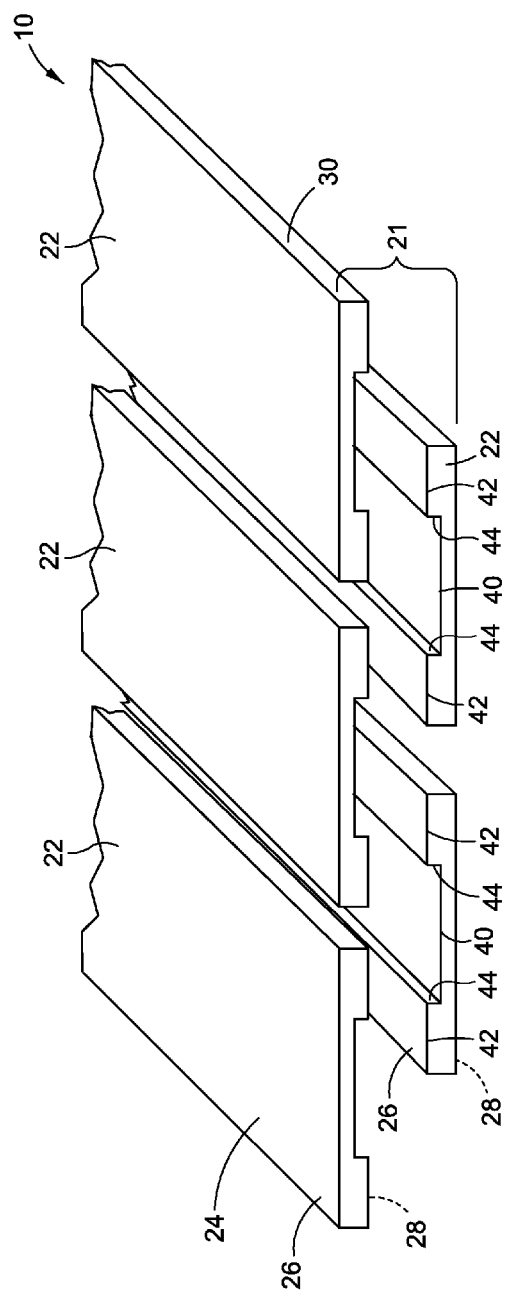

FIBERS WITH INTERLOCKING SHAPES

CROSS-REFERENCE TO RELATED APPLICATIONS

This application is related to co-filed application Ser. No. 12/968,514 entitled CONTROLLED FIBER-MATRIX ADHESION FOR POLYMER FIBER COMPOSITES and filed on Dec. 15, 2010. This application is also related to co-filed application Ser. No. 12/968,557 entitled OPTIMIZED FIBER SHAPES FOR IMPROVED OPTICAL PERFORMANCE and filed on Dec. 15, 2010. This application is additionally related to co-filed application Ser. No. 12/968,575 entitled SELECTIVELY COUPLED FIBERS IN COMPOSITES and filed on Dec. 15, 2010. The entire contents of the above-mentioned applications are expressly incorporated by reference herein.

FIELD

The present disclosure relates generally to composites and, more particularly, to fiber reinforced composite articles having improved ballistic performance.

BACKGROUND

Composite structures typically comprise a matrix reinforced with fibers wherein the fibers are embedded in the matrix. Composite structures are designed to transmit loads along the length of the fibers. Loads from one fiber may be transferred to another fiber in the same layer or to fibers in an adjacent layer by passing through the matrix material. However, the matrix is typically weaker than the fibers such that when a sufficiently high load is transmitted from one fiber to another fiber across the matrix, the matrix will fail. The failure of the matrix allows the fibers to move laterally within the composite structure.

During a ballistic event where a composite panel may be impacted by a projectile, the ability of the fibers to move laterally or sideways is generally detrimental to the overall ballistic performance of the composite panel. For example, the ability of the fibers in the matrix to move laterally allows the projectile to wedge between the fibers. The wedging of the projectile between the fibers allows the projectile to penetrate the thickness of a composite panel without fracturing the fibers. In this regard, lateral movement of the fibers and subsequent wedging of a projectile reduces the ballistic performance capabilities of the panel.

As can be seen, there exists a need in the art for a composite structure that provides reduced susceptibility to lateral movement of the fibers such that ballistic performance may be improved.

BRIEF SUMMARY

The above-described needs associated with composite structures for ballistic applications are specifically addressed and alleviated by the present disclosure which, in an embodiment, provides a composite article which may include a plurality of fibers at least partially embedded in a matrix. Each one of the fibers may have upper, lower and side surfaces. At least one of the upper and lower surfaces of at least one of the fibers may include a notch region and a pair of side regions on opposite sides of the notch region. The plurality of fibers may be arranged in layers. At least one of the fibers of one of the layers may be received within the notch region of at least one of the fibers of another one of the layers.

Also disclosed is a fiber having upper, lower and side surfaces. At least one of the upper and lower surfaces may have a notch region and a pair of side regions on opposite sides of the notch region. The notch region may be configured to receive the side region of an adjacent fiber.

The present disclosure additionally includes a method of manufacturing a composite article. The method may include the steps of forming a plurality of fibers with upper, lower and side surfaces. A notch region may be formed in the fiber in at least one of the upper and lower surfaces of the fibers and extending axially along a length of the fiber. A pair of side regions may be formed on opposite sides of the notch region. The notch region may be configured to receive the side region of another one of the fibers.

In a further embodiment, disclosed is a method of manufacturing a composite article including the step of forming a plurality of fibers with upper, lower and side surfaces. The method may further include forming a notch region and a pair of side regions on opposite lateral sides of the notch region in at least one of the upper and lower surfaces of the fibers. The method may additionally include receiving a pair of side regions of a corresponding pair of fibers within the notch region of one of the fibers. The plurality of fibers may be positioned in side-by-side arrangement such that the side surface of at least one of the fibers is substantially parallel to the side surface of an immediately adjacent one of the fibers. The method may include at least partially embedding the fibers in a matrix and curing or solidifying the matrix to form the composite article.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numerals refer to like parts throughout and wherein:

FIG. 1 is a perspective illustration of a composite article in an embodiment comprising matrix material and a plurality of fibers embedded within the matrix;

FIG. 2 is an exploded perspective illustration of the composite article of FIG. 1 and illustrating a plurality of the fibers arranged in layers and being interlocked with one another by notch regions formed in the fibers;

FIG. 4 is a sectional illustration of the composite article taken along line 4 of FIG. 3 and illustrating a plurality of fibers each having a notch region and a pair of side regions on opposite sides of the notch region;

FIG. 5 is an exploded perspective illustration of the fibers of FIG. 4 and further illustrating the notch regions formed in the fibers;

DETAILED DESCRIPTION

Figure 3:
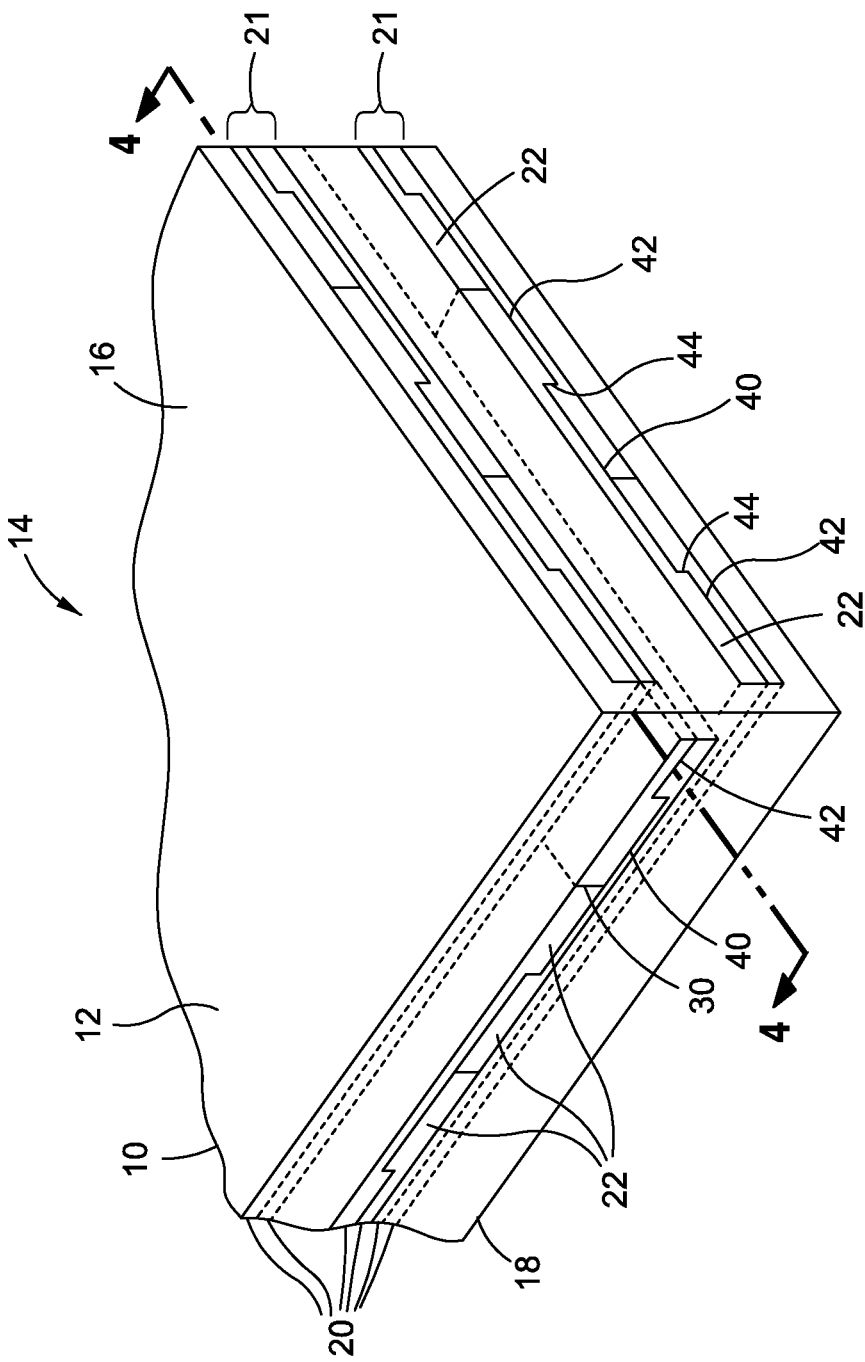
FIG. 3 is an enlarged perspective illustration of a portion of the composite article taken along line 3 of FIG. 1 and illustrating the interlocking of the fibers.

Referring now to the drawings wherein the showings are for purposes of illustrating preferred and various embodiments of the disclosure, shown in FIG. 1 is an embodiment of a composite article 10. The composite article 10 may be fabricated as a fiber-reinforced composite panel 14 comprising a matrix 18 and a plurality of fibers 22 embedded within the matrix 18. Advantageously, the matrix 18 may be formed of substantially optically transparent material. Likewise, the fibers 22 may be formed of substantially optically transparent fiber 22 material. Although the composite article 10 is illustrated in FIG. 1 in a panel 14 configuration having substantially planar panel surfaces 16, the composite article 10 may be provided in any one of a wide variety of sizes, shapes and configurations, without limitation, and may include planar surfaces and/or compound curvature surfaces.

Advantageously, the composite article 10 as disclosed herein includes notch regions 40 (FIG. 2) extending axially along a length of the fibers 22 and enabling interlocking of the fibers 22 in a lateral or in-plane direction 46 (FIGS. 4-10) and, optionally, enabling interlocking in an out-of-plane direction 48 (FIGS. 6, 8-10) as described below. The in-plane interlocking 46 of fibers 22 may restrict or prevent relative movement of at least one of the fibers 22 of one layer 20 with at least one of the fibers 22 of an adjacent layer 20. The interlocked fibers 22 of two different layers 20 comprise a coupled layer pair 21. The interlocking of the fibers 22 may improve the ballistic performance of the composite article 10 by preventing wedging of a projectile between the fibers 22. In addition, the interlocking of the fibers 22 may improve the optical quality of the composite article 10 by minimizing gaps between adjacent fibers 22. Even further, the addition of the notch regions 40 may advantageously improve and/or control the mechanical properties of the composite article 10 including improving properties such as interlaminar shear strength, stiffness, compression strength, fracture toughness and damage tolerance of the composite article 10. In addition, the optical performance of the composite article 10 may be improved by orienting the side surfaces 30 (FIG. 4) of the fibers 22 in non-perpendicular relation to the upper and lower surfaces 26, 28 (FIG. 4) of the fibers 22 to minimize the amount of light passing through the matrix 18 and between the fibers 22 otherwise resulting in a phase difference with the light passing through both the matrix 18 and the fibers 22 resulting in optical distortion.

Referring to FIG. 1, shown is the composite article 10 formed as a panel 14 and including a plurality of the fibers 22 embedded within the matrix 18. The fibers 22 may function as structural reinforcement for the matrix 18 and may improve the mechanical and ballistic performance of the composite article 10. For example, the fibers 22 provide structural reinforcing to improve the specific stiffness of the composite article 10 (i.e., the stiffness of the composite article 10 divided by the density thereof) as a result of the enhanced tensile strength and modulus of elasticity of the fibers 22. In this regard, it should be noted that in the context of the present disclosure, properties such as strength, strain and stiffness are in terms of dynamic properties and/or quasi-static properties.

Ballistic performance may be improved due to the interlocking of the fibers 22 provided by the notch regions 40 (FIG. 2) formed in one or more of the fibers 22. More specifically, the notch regions 40 interlock the fibers 22 of one layer 20 with the fibers 22 of an adjacent layer 20 limiting the ability of the interlocked fibers 22 to move laterally relative to one another and relative to the matrix 18. The technical effect of the interlocking provided by the notch regions 40 is a reduction or elimination of wedging of a projectile between the fibers 22. During wedging, the projectile may undesirably push the fibers 22 laterally such that the projectile may pass between the fibers 22 allowing the projectile to penetrate the composite panel 14 without breaking the fibers 22. However, the present disclosure minimizes or reduces such lateral movement of the fibers 22 by interlocking the fibers 22 with the notch regions 40 formed in the fibers 22.

Furthermore, the notch regions 40 (FIG. 2) result in an increase in energy required by the projectile to break the in-plane interlocking 46 (FIGS. 4-10) that would otherwise facilitate lateral separation of fibers 22. In addition, the notch regions 40 may be configured to provide both in-plane and out-of-plane interlocking 46, 48 (FIGS. 6, 8-10) in certain configurations causing the fibers 22 to remain in close proximity to one another and resulting in a composite panel 14 having improved resistance to penetration such as from a projectile. The notch regions 40 may further provide improved damage resistance such that the composite article 10 may continue to carry structural loads following impact by a projectile.

Referring to FIG. 2, shown is an exploded illustration of the composite article 10 or panel 14 of FIG. 1 and illustrating a plurality of the fibers 22 formed as strips and arranged in layers 20 within the matrix 18. As illustrated in FIG. 2, the fibers 22 are arranged in strips and are necessarily aligned with one another by virtue of the notch regions 40 extending along the length of each one of the fibers 22. Each one of the fibers 22 may have an elongated cross-sectional shape that may include an opposed pair of substantially planar fiber surfaces 24 as best seen in FIG. 4. In an embodiment similar to that which is illustrated in FIG. 2, the fiber surfaces 24 such as the upper and lower surfaces 26, 28 (FIG. 4) may be oriented substantially parallel to the article surface 12 of the composite article 10 in order to enhance the optical performance of the composite article 10.

Referring to FIG. 3, shown is an enlarged perspective illustration of the composite article 10 wherein the fibers 22 are arranged in layers 20 within the matrix 18. The layers 20 may be arranged in any orientation relative to one another within the composite article 10 and are not limited to the cross-ply configuration shown in FIG. 3. Furthermore, although the composite article 10 in FIG. 3 is illustrated as having six of the layers 20 of fibers 22 forming three coupled layer pairs 21 (FIGS. 1-2), any quantity of layers 20 may be provided in any arrangement of interconnectivity. For example, the composite article 10 may contain a single layer 20 of fibers 22 that may include notch regions 40 but which may not be interconnected to fibers 22 of another layer 20. Furthermore, the composite article 10 may include fibers 22 forming any number of coupled layer pairs 21. One or more of the coupled layer pairs 21 may be interconnected to one or more of the other coupled layer pairs 21 by means of the notch regions 40 formed in the upper and/or lower surfaces 26, 28 (FIG. 4) of one or more of the fibers 22. In this regard, the composite article 10 may be comprised of a single layer 20 of fibers 22 or tens or more of the layers 20 of fibers 22. The layers 20 may be oriented in any direction relative to one another. More specifically, the fibers 22 in any layer 20 may be oriented at any angle relative to the fibers 22 of adjacent layers 20.

FIG. 3 illustrates several layers 20 each comprising fibers 22 interlocked with the fibers 22 of adjacent layers 20 via the notch regions 40. The layers 20 may comprise fibers 22 oriented in any direction relative to the fibers 22 of an immediately adjacent layer 20. For example, FIG. 3 illustrates a cross-ply configuration wherein the fibers 22 of one layer 20 of a coupled layer pair 21 are oriented perpendicularly relative to the fibers 22 of the immediately adjacent layer 20 of a coupled layer pair 21. It should be noted that FIG. 3 is an illustration of a non-limiting embodiment of the composite article 10 and is not to be construed as limiting alternative configurations of the composite article 10 or alternative arrangements of the layers 20 of fibers 22 within the matrix 18. For example, the layers 20 may be oriented in perpendicular orientation relative to one another as illustrated in FIG. 3 or in any non-perpendicular orientation (e.g., 15°, 22.5°, 45°, 60°, 75°, etc.) relative to adjacent layers 20.

Referring to FIG. 4, shown is an enlarged cross-sectional illustration of a portion of the composite article 10 taken along line 4 of FIG. 3 and illustrating a pair of layers 20 of fibers 22 interlocked with one another. As can be seen in FIG. 4, each one of the fibers 22 preferably has an elongated cross-sectional shape with relatively flattened or substantially planar fiber 22 faces to minimize bending or refracting of light that may otherwise occur when light passes through a curve surface. In this regard, the substantially planar configuration of the fiber 22 improves the optical performance of the composite article 10.

Referring to FIGS. 4-5, the generally elongated shape of the fibers 22 preferably have a relatively high aspect ratio. The aspect ratio may be defined as the ratio of fiber width 34 (FIG. 4) to fiber thickness 32 (FIG. 4). In an embodiment, the aspect ratio may vary from approximately 3 to approximately 500 although the cross section of the fibers 22 may be provided in any aspect ratio. In an embodiment, the fiber thickness 32 may be in the range of from approximately 5 microns to approximately 5,000 microns (e.g., 0.002 to 0.20 inch). However, the fiber 22 may be provided in any fiber thickness 32, without limitation.

Figure 7:
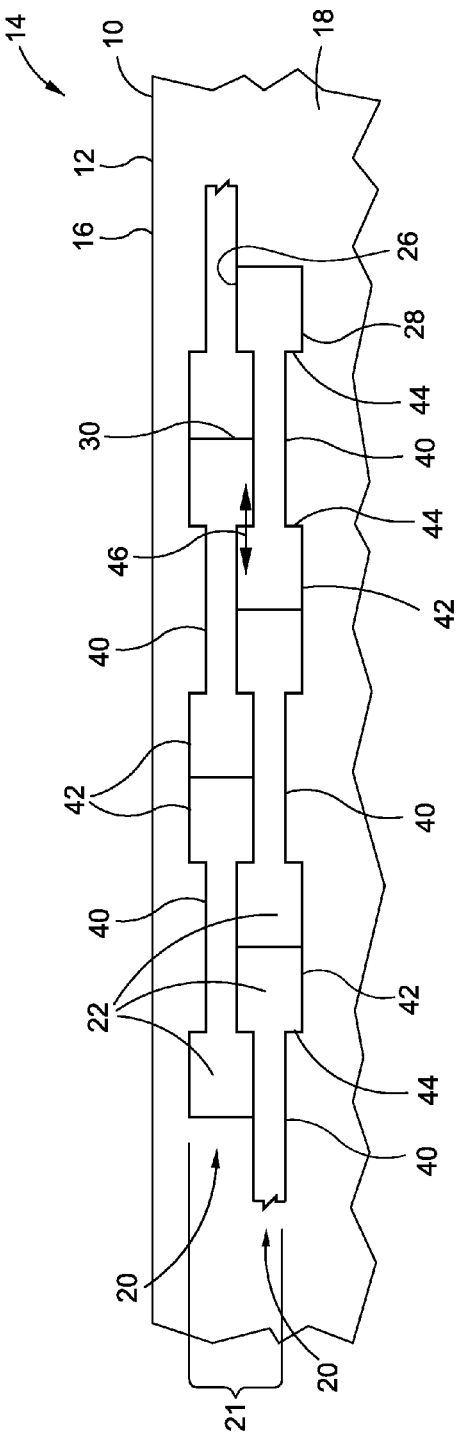
FIG. 7 is a cross-sectional illustration of a plurality of the fibers each having notch regions formed in the upper and lower surfaces.
Figure 9:
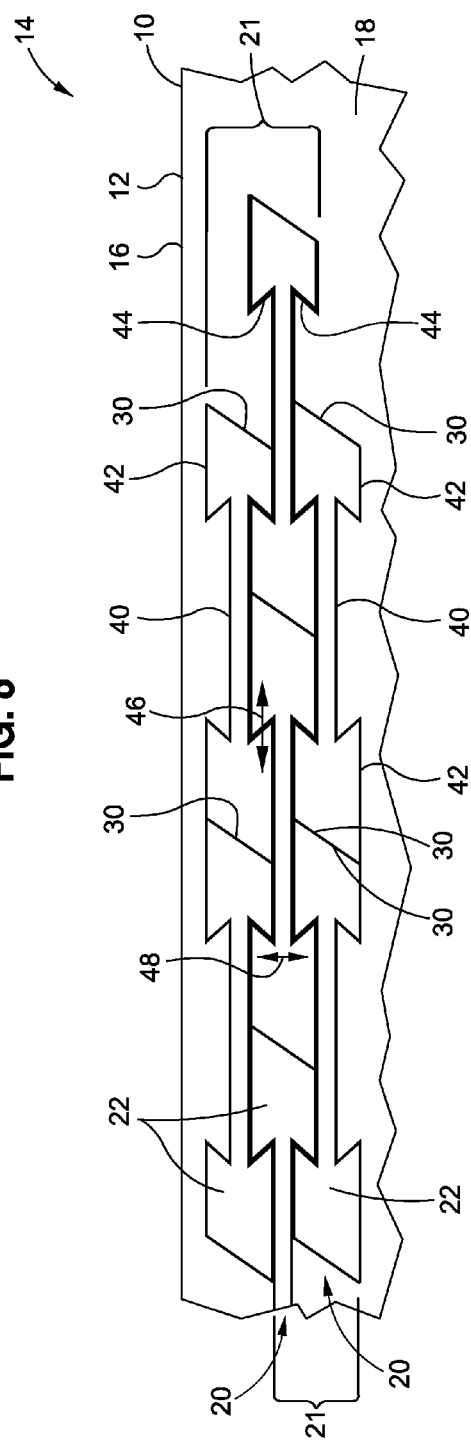
FIG. 9 is a cross-sectional illustration of a plurality of the fibers illustrating notch regions formed in each one of the upper and lower surfaces of each fiber and further illustrating angled notch sidewalls and angled side surfaces of the fibers.

As shown in FIGS. 4-5, the upper and lower surfaces 26, 28 of the fibers 22 are preferably oriented in substantially parallel relation to one another. However, the fibers 22 may be provided in alternative configurations wherein the upper and lower surfaces 26, 28 are oriented in non-parallel relation to one another. As was earlier mentioned, each one of the fibers 22 preferably includes a notch region 40 extending axially along a length of the fiber 22. Although FIG. 4 illustrates the notch region 40 formed in one of the upper and lower surfaces 26, 28 of each fiber 22, the fiber 22 may be provided in an embodiment wherein the notch regions 40 are formed in both the upper and lower surfaces 26, 28 of each fiber 22 as illustrated in FIGS. 7 and 9 and described in greater detail below.

Referring to FIGS. 4-5, the notch region 40 for the fibers 22 may be generally centered within a width of the fiber 22. However, it is contemplated that the fibers 22 may be provided in configurations wherein the notch region 40 is biased toward one of the side surfaces 30 of the fibers 22. For fiber 22 configurations having notch regions 40 in both of the upper and lower surfaces 26, 28 as illustrated in FIGS. 7 and 9, the notch region 40 in the upper surface 26 may be generally aligned with the notch region 40 in the lower surface 28 of the fiber 22 as described in greater detail below. However, the notch regions 40 in the upper and lower surfaces 26, 28 may be offset from one another.

Figure 6:
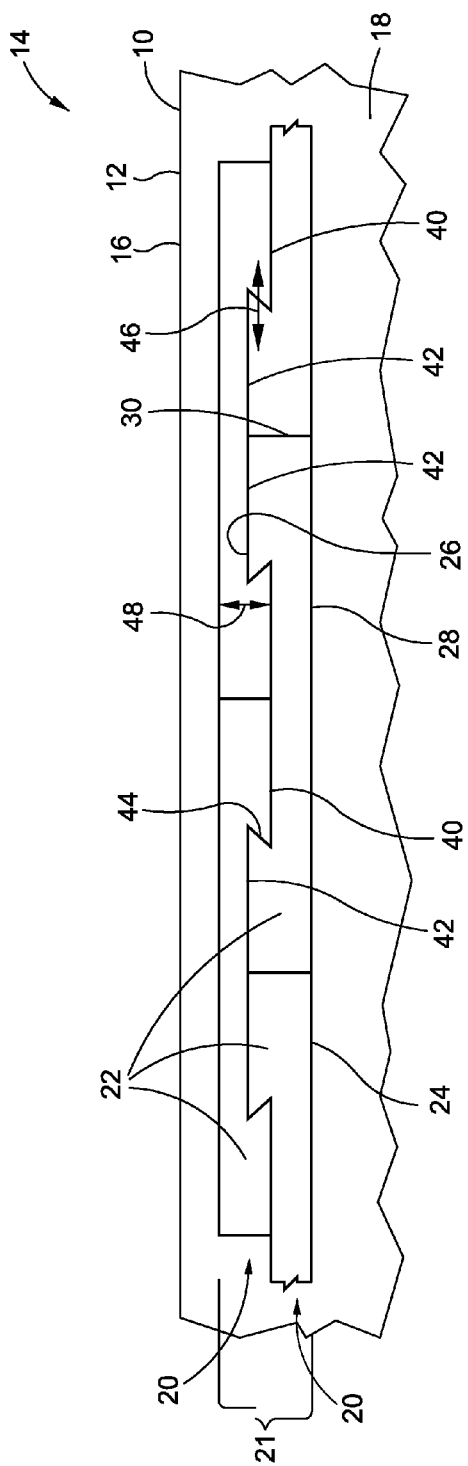
FIG. 6 is a cross-sectional illustration of a further embodiment of the fibers wherein the notch regions include angled notch sidewalls for engaging one another and providing resistance against in-plane movement and out-of-plane movement of the fibers relative to one another.
Figure 8:
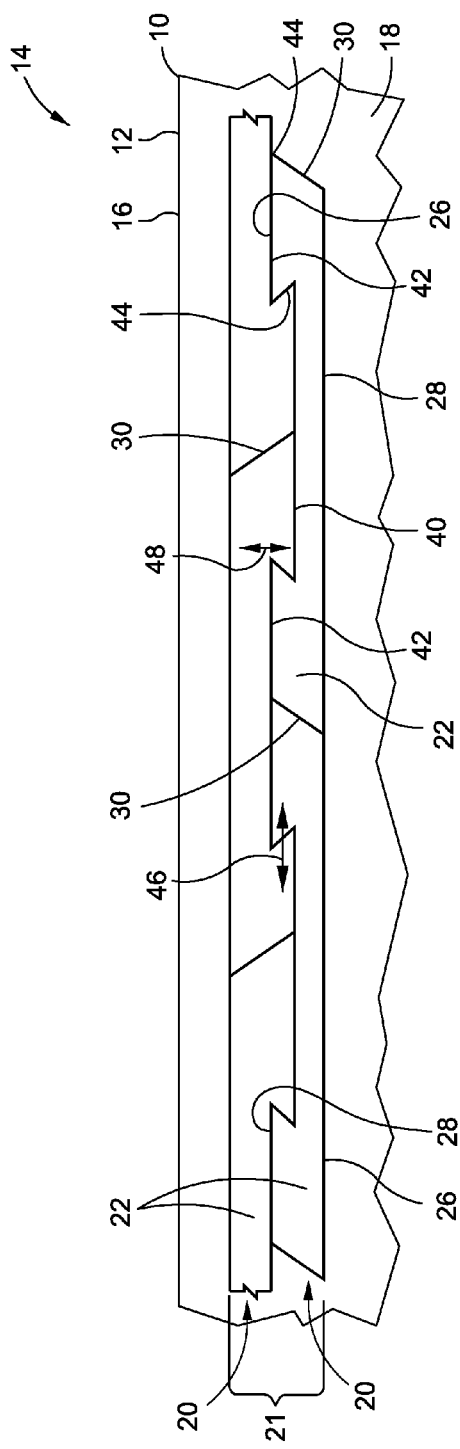
FIG. 8 is a cross-sectional illustration of a plurality of the fibers having side surfaces oriented in non-perpendicular relation to the upper and lower surfaces of the fiber.

The notch region 40 may result in the fibers 22 having a thickness in the notch region 40 that is less than the fiber thickness 32 in the side regions 42. As can be seen in FIGS. 4-5, each one of the notch regions 40 has one of the side regions 42 disposed on opposite lateral sides of the notch region 40. The thickness of a fiber 22 in the notch region 40 is illustrated as being generally less than the thickness of the fiber 22 in the side regions 42. However, the fiber 22 may be provided in a configuration wherein the notch region 40 and side regions 42 have substantially similar thicknesses. In such a configuration (not shown), the fiber 22 may form a relatively shallow hat section as compared to the relatively shallow U-shaped sections formed by the configuration illustrated in FIGS. 4-5. The notch region 40 may be bounded on opposed lateral sides by notch sidewalls 44. FIGS. 4 and 5 illustrate the notch sidewalls 44 as being oriented perpendicularly relative to the upper and lower surfaces 26, 28. However, FIGS. 6, 8 and 9 illustrate notch sidewalls 44 formed at angles that are non-perpendicular relative to the upper and lower surfaces 26, 28. It should be noted that although the notch regions 40, side regions 42, notch sidewalls 44 and side surfaces 30 are illustrated as including relatively planar surfaces with relative sharp corners, the fibers 22 may be configured such that the notch regions 40 including the side regions 42, side surfaces 30 and the notch sidewalls 44 may be formed with curved surfaces or a combination of planar surfaces and curved surfaces. In addition, the corners of the notch sidewalls 44 and side surfaces 30 may be rounded, beveled, chamfered or otherwise provided with non-sharp corners.

As indicated above, the side regions 42 of one fiber 22 may be received within the notch region 40 of an adjacent one of the fibers 22 of the layer 20 to form a coupled layer pair 21. For example, as shown in FIG. 4, each notch region 40 may receive a pair of the side regions 42 of an adjacent pair of fibers 22 of an adjacent layer 20 as shown in FIG. 4. In this regard, the fibers 22 are positioned in side-by-side arrangement and are retained to one another by means of the interlocking of the notch regions 40. The fibers 22 may be arranged such that the side surfaces 30 of the fibers 22 are preferably oriented substantially parallel to one another. For example, FIG. 4 illustrates the side surfaces 30 of each one of the fibers 22 being oriented parallel to one another and substantially perpendicular relative to the upper and lower surfaces 26, 28.

Likewise, FIGS. 6 and 7 illustrate the side surfaces 30 oriented substantially perpendicularly relative to the upper and lower surfaces 26, 28. In addition, FIG. 6 illustrates the notch sidewalls 44 of each one of the notch regions 40 being oriented non-perpendicularly relative to the upper and lower surfaces 26, 28. In this regard, FIG. 6 illustrates a coupled layer pair 21 and representing a fiber 22 configuration providing in-plane interlocking 46 and out-of-plane interlocking 48 by virtue of the orientation of the notch sidewalls 44.

Referring to FIG. 7, shown are the notch regions 40 wherein the notch sidewalls 44 are oriented substantially perpendicularly relative to the upper and lower surfaces 26, 28 such that the notch regions 40 provide in-plane interlocking 46 of the fibers 22. FIG. 7 further illustrate the notch regions 40 formed in each one of the upper and lower surfaces 26, 28 of each one of the fibers 22 to provide a greater degree of in-plane interlocking 46 of adjacent fibers 22 than that which is provided by the single notch region 40 of the fibers 22 illustrated in FIGS. 4 and 5. FIG. 7 also illustrates the notch regions 40 formed in both the upper and lower surfaces 26, 28 of each one of the fibers 22 to facilitate interlocking of each fiber 22 to the fibers 22 of layers 20 located one each side of each fiber 22. Although, FIG. 7 illustrates two of the layers 20 interconnected to one another to form a coupled layer pair 21, the notch regions 40 on both upper and lower surfaces 26, 28 of the fibers 22 facilitates in-plane interconnection of additional layers 20 beyond the two layers 20 illustrated in FIG. 7.

Referring to FIG. 8, shown is an embodiment of the fibers 22 wherein the notch sidewalls 44 are oriented non-perpendicularly relative to the upper and lower surfaces 26, 28. Likewise, the side surfaces 30 of the fibers 22 are oriented non-perpendicularly relative to the upper and lower surfaces 26, 28 to provide out-of-plane interlocking 48 of the fibers 22. In an embodiment illustrated in FIG. 8, the side surfaces 30 may be oriented at any angle relative to the upper and lower surfaces 26, 28. For example, the side surfaces 30 may be oriented between approximately 10° and 170° relative to the upper and lower surfaces 26, 28 although the side surfaces 30 may be oriented at angles less than 10 degrees or greater than 170 degrees relative to the upper and lower surfaces 26, 28. Furthermore, although FIG. 8 illustrates each fiber 22 having side surfaces 30 and notch sidewalls 44 oriented non-perpendicularly relative to the upper and lower surfaces 26, 28, the fibers 22 may be provided in a configuration where only the side surfaces 30 are oriented non-perpendicularly relative to the upper and lower surfaces 26, 28 and the notch sidewalls 44 are oriented substantially perpendicularly relative to the upper and lower surfaces 26, 28, or vice versa. It should also be noted that although the side surfaces 30 and notch sidewalls 44 are illustrated as being oriented at substantially the same angle relative to one another, the side surfaces 30 may be oriented at a different angle relative to the notch sidewalls 44.

Referring to FIG. 9, shown is an alternative embodiment of the fibers 22 illustrating the notch regions 40 of each fiber 22 being formed with notch sidewalls 44 having a non-perpendicular orientation relative to the upper and lower surfaces 26, 28 (FIG. 8). Likewise, the side surfaces 30 of the fibers 22 may be formed at a non-perpendicular angle relative to the upper and lower surfaces 26, 28 to provide enhanced interlocking and resistance to movement of the fibers 22. FIG. 9 also illustrates the notch regions 40 formed in both the upper and lower surfaces 26, 28 of each one of the fibers 22 to facilitate interlocking of each fiber 22 to the fibers 22 of layers 20 located on each side of each fiber 22 similar to that which is illustrated in FIG. 7 and described above. In this regard, FIG. 9 illustrates three of the layers 20 having notch regions 40 on both upper and lower surfaces 26, 28 to facilitate interconnection thereof to form two of the coupled layer pairs 21. As may be appreciated, any quantity of layers 20 may be interconnected by means of the notch regions 40 on the upper and lower surfaces 26, 28 of each of the fibers 22.

Figure 10:
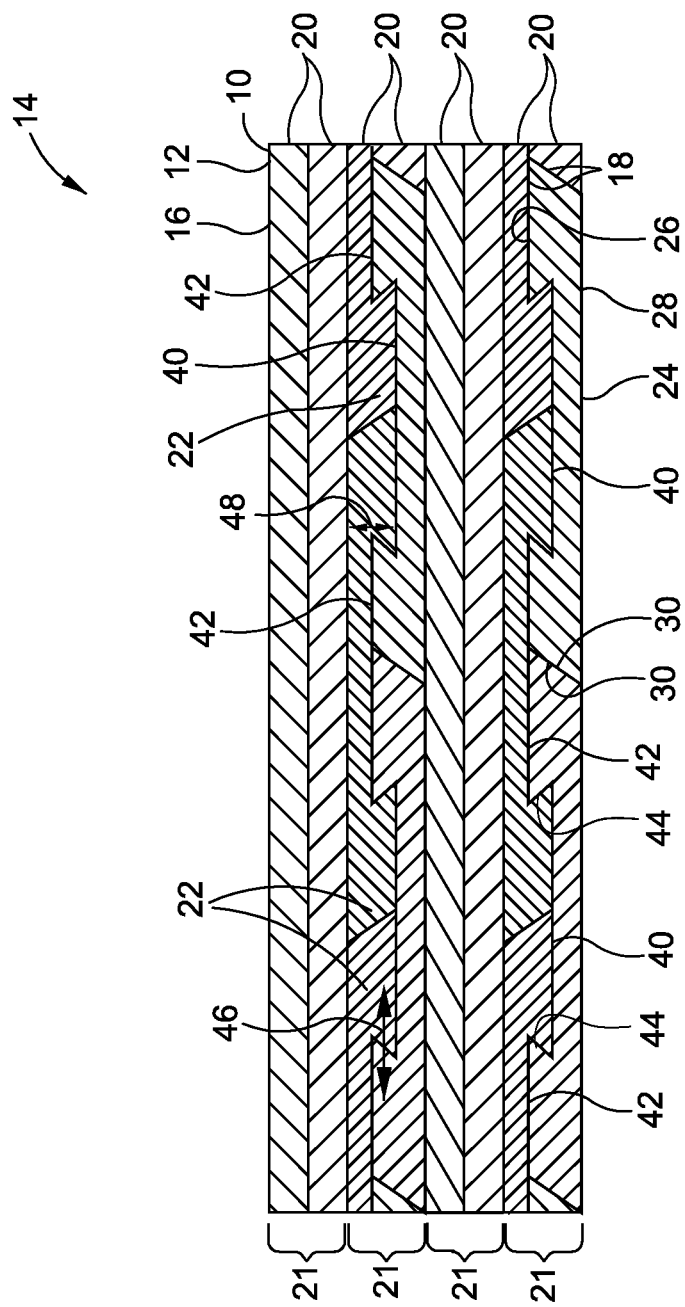
FIG. 10 is a an illustration of a plurality of layers of the composite article in a cross-ply configuration illustrating coupled layer pairs of the fibers oriented perpendicularly relative to adjacent coupled layer pairs of the fibers.

Referring to FIG. 10, shown is a sectional illustration of a portion of a composite article 10 comprising a stack of eight of the layers 20 of fibers 22 and forming four coupled layer pairs 21. As can be seen, the layers 20 of the coupled layer pairs 21 are oriented generally perpendicularly relative to the layers 20 of the adjacent coupled layer pairs 21. In this regard, FIG. 10 illustrates a cross-ply configuration of the layers 20 similar to the cross-ply configuration of the fibers 22 illustrated in FIGS. 2 and 3. More particularly, FIG. 10 illustrates two of the coupled layer pairs 21 extending out of the page and two of the coupled layer pairs 21 extending along the plane of the page. As may be appreciated, any quantity of layers 20 may be interconnected in any arrangement by providing notch regions 40 on one or more of the upper and/or lower surfaces 26, 28 of the fibers 22.

In the embodiments illustrated in FIGS. 1-10, matrix 18 material may be provided between each of the upper and lower surfaces 26, 28 of the fibers 22 including between the side surfaces 30 of adjacent fibers 22 and between the notch region 40 and notch sidewalls 44 of the adjacent fibers 22. The matrix 18 material may physically and optically couple the fibers 22 to one another. In the embodiments illustrated in FIGS. 1-10, the fiber 22 arrangements resist separation in an in-plane direction. In addition, certain embodiments of the fibers 22 having angled notch sidewalls 44 as illustrated in FIGS. 6, 8 and 9 may provide resistance against out-of-plane separation due to the non-perpendicular orientation of the notch sidewalls 44.

Advantageously, the fibers 22 resist separation due to the interlocking effect which provides a means for controlling the amount of relative movement of the fibers 22 in the matrix 18 under different loading conditions. During impact of a projectile with the composite article 10 such as the panel 14 illustrated in FIG. 1, it may be desirable for the fibers 22 to resist in-plane separation while allowing other unconnected layers 20 of the fibers 22 to move relative to one another. For example, in the arrangement illustrated in FIG. 10, the uppermost coupled layer pairs 21 may resist in-plane spreading of the fibers 22 (i.e., in the lateral direction) while the layers 20 immediately below the uppermost coupled layer pairs 21 may be unconnected to the uppermost coupled layer pairs 21 and may therefore move laterally relative to the layers 20 of the uppermost coupled layer pairs 21.

Relative motion between pairs of layers 20 may be controlled by selection of the material properties of the matrix 18 and adhesive that may optionally be included for bonding the layers 20 together. For example, it may be desirable to select an adhesive that provides a limited degree of movement of the layers 20 relative to one another. Relative movement or slippage of certain fibers 22 within the matrix 18 may be desirable during a ballistic event such that a greater portion of the length of certain fibers 22 may contribute toward deceleration of a projectile.

The fibers 22 and the matrix 18 (FIGS. 1-10) may be formed of any suitable material which is preferably substantially optically transparent although the fibers 22 and/or matrix 18 may be formed of opaque materials. In this regard, matrix 18 and/or the fibers 22 may be formed of any material having any degree of transparency between substantially transparent and substantially opaque. The matrix 18 and/or the fibers 22 may be formed of thermoplastic material and which may comprise at least one of the following: acrylics, fluorocarbons, polyamides, polyethylenes, polyesters, polypropylenes, polycarbonates, polyurethanes, polyetheretherketone, polyetherketoneketone, polyetherimides, epoxy and inorganic resins. Resins and oils may also be used for the matrix 18. The matrix 18 and/or the fibers 22 may also be formed of a thermosetting material comprising at least one of the following: polyurethanes, phenolics, polyimides, bismaleimides, polyesters, epoxy, and silsesquioxanes. The matrix 18 and/or the fibers 22 may be formed of inorganic materials including, but not limited to, carbons, silicon carbide, and boron. The matrix 18 and/or the fibers 22 may additionally be formed of glass such as E-glass (alumino-borosilicate glass), S-glass (alumino silicate glass), pure silica, borosilicate glass and optical glass. The fibers 22 may additionally be formed of metallic material.

The composite article 10 (FIGS. 1-10) as disclosed herein may be implemented in a variety of applications. For example, the composite article 10 may be implemented as a ballistic panel 14 for a vehicular application such as for an aircraft windshield, canopy or window. In addition, the composite article 10 may be implemented in any non-vehicular application such as a membrane, a structural panel, an architectural panel, or a non-structural panel 14. In this regard, the composite article 10 may be formed in any size, shape and configuration for any vehicular or non-vehicular application, without limitation.

Figure 11:
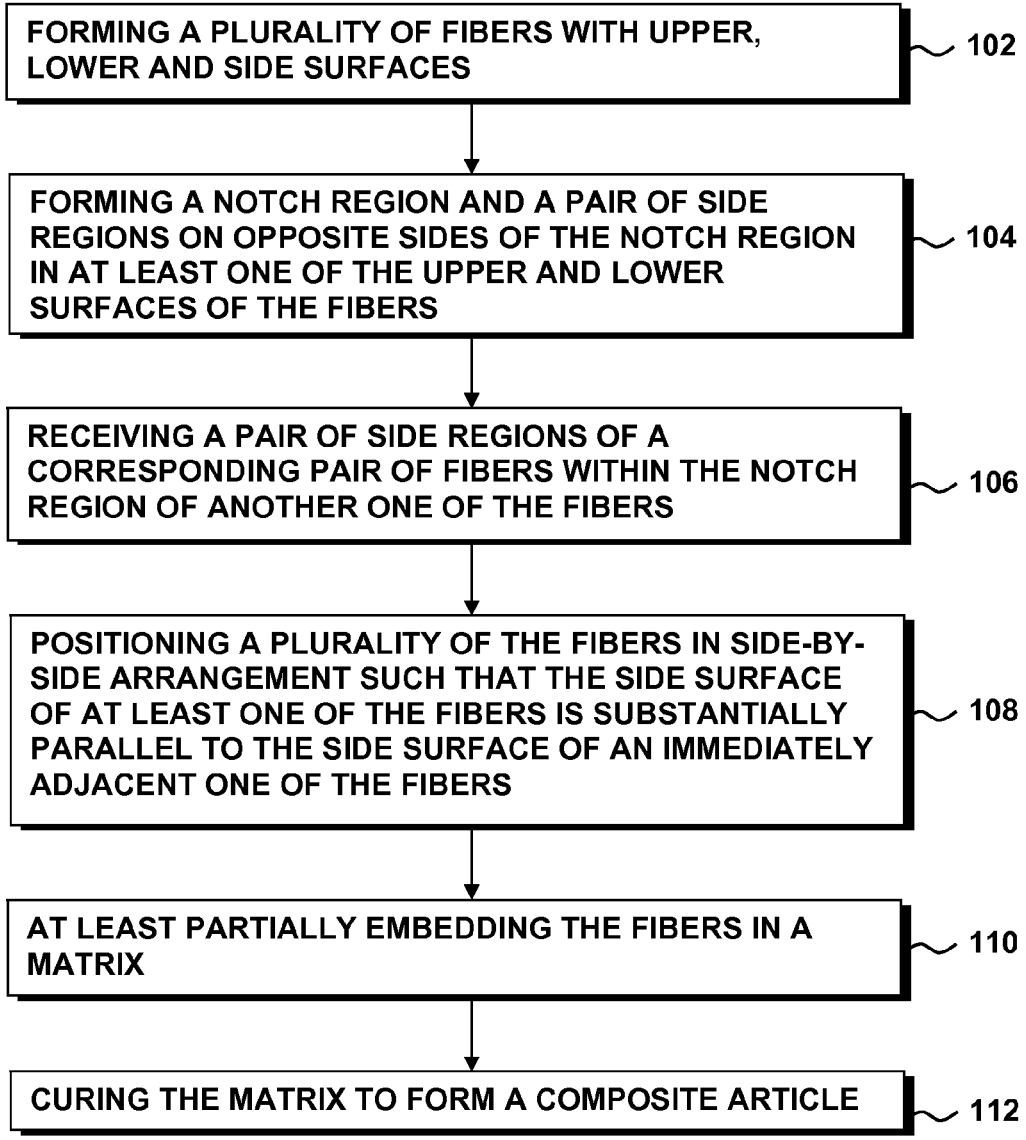
FIG. 11 is a flow diagram illustrating one or more operations that may be included in a methodology for manufacturing a composite article.

Referring to FIG. 11, shown is a flow diagram illustrating one or more operations that may be included in a methodology for manufacturing the composite article 10. In Step 102, the composite article 10 may be manufactured by forming a plurality of fibers 22 (FIG. 4) with upper, lower and side surfaces 26, 28, 30 (FIG. 4). The fibers 22 may be formed by extrusion, pultrusion or other suitable manufacturing process. The upper and lower surfaces 26, 28 may be formed to be substantially parallel to one another and may be generally planar. The fibers 22 may be formed in elongated cross-sectional shapes and may have an aspect ratio of fiber width 34 (FIG. 4) to fiber thickness 32 (FIG. 4) in the range of from approximately 3 to approximately 500 although other aspect ratios outside the 3-500 range are contemplated.

The side surfaces 30 (FIG. 4) of the fibers 22 may be formed in substantially perpendicular relation to the upper and lower surfaces 26, 28 or in non-perpendicular relation to the upper and lower surfaces 26, 28 as shown in FIG. 6. In this regard, the side surfaces 30 may be formed at any angle relative to the upper and lower surfaces 26, 28. For example, the side surfaces 30 may be formed at an angle of between approximately 10° and 170° relative to at least one of the upper and lower surfaces 26, 28 although larger or smaller angles are contemplated.

Referring still to FIG. 11, Step 104 may comprise forming a notch region 40 and a pair of side regions 42 on opposite lateral sides of the notch region 40 in the upper and/or lower surfaces 26, 28 of each one of the fibers 22 similar to that which is illustrated in FIGS. 4-9. As can be seen in FIGS. 4-9, the notch region 40 may result in a thickness of the fiber 22 at the side regions 42 being greater than the fiber thickness 32 in the notch region 40.

For the configurations shown in FIGS. 7 and 9, the notch regions 40 may be formed in both of the upper and lower surfaces 26, 28 and the notch regions 40 may be generally vertically aligned with one another as shown in FIGS. 7 and 9 although the notch regions 40 may be offset relative to one another. In one or more of the configurations, the notch region 40 may be generally centered within the width of the fiber 22 as shown in FIGS. 1-10 although the notch region 40 may be biased toward one of the side surfaces 30 of the fibers 22. Referring to FIGS. 4-10, the notch region 40 may include notch sidewalls 44 which may be formed at any angle relative to the upper and lower surfaces 26, 28. For example, the notch regions 40 may be formed perpendicularly relative to the upper and lower surfaces 26, 28 as illustrated in FIGS. 4, 5, and 7. Alternatively, the notch sidewalls 44 may be formed at a non-perpendicular angle relative to the upper and lower surfaces 26, 28 similar to that which is illustrated in FIGS. 6 and 8-10.

Referring to FIG. 11, Step 106 may comprise receiving a pair of the side regions 42 of a corresponding pair of fibers 22 within a notch region 40 of a fiber 22 to interconnect the fibers 22 as illustrated in FIGS. 6-10. As shown in the figures, each one of the notch regions 40 accommodates a pair of the side regions 42 of a respective pair of fibers 22. Step 108 of the methodology of FIG. 11 may comprise positioning a plurality of the fibers 22 in side-by-side relationship to one another such that the side surface 30 of at least one of the fibers 22 is oriented substantially parallel to the side surface 30 of an immediately adjacent one of the fibers 22. The fibers 22 are preferably configured such that the side surfaces 30 of adjacent fibers 22 are in close proximity to one another.

The interconnected fibers 22 of one layer 20 may be oriented lengthwise at any angle relative to the lengthwise orientation of the fibers 22 of an adjacent layer 20. For example, as illustrated in FIGS. 1-3, the layers 20 may be oriented substantially perpendicularly relative to the adjacent layers 20. Alternatively, a plurality of layers 20 having substantially parallel fibers 22 may be interconnected for embodiments including notch regions 40 in both the upper and lower surfaces 26, 28 of the fibers 22 similar to that which is illustrated in FIGS. 7 and 9. It is also contemplated that layers 20 of fibers 22 that are oriented in non-perpendicular relation to one another may be interconnected by providing localized features (not shown) to engage the notch regions 40 extending axially along the fibers 22 of the adjacent layers 20.

Referring to FIG. 11, Step 110 may comprise at least partially embedding the fibers 22 in a matrix 18 similar to that which is illustrated in FIGS. 1-3. As indicated above, the matrix 18 is preferably formed of substantially optically transparent material. Likewise, the fibers 22 are preferably formed of substantially optically transparent material. Step 112 of FIG. 11 may comprise curing or solidifying the matrix 18 and/or fibers 22 to form the composite article 10. In this regard, the composite article 10 may be subjected to heat and/or pressure to facilitate curing or solidifying.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A composite article, comprising:
   a plurality of fibers each having upper, lower and side surfaces;
   at least one of the upper and lower surfaces of at least one of the fibers having a notch region and a pair of side regions on opposite sides of the notch region;
   the plurality of fibers being arranged in layers;
   at least one of the fibers of one of the layers being received within the notch region of at least one of the fibers of an adjacent one of the layers to form a coupled layer pair; and wherein an upper surface of the one of the layers is above and upper surface of the adjacent one of the layers.

2. The composite article of claim 1 wherein:
   the fiber having a thickness in the notch region that is less than the fiber thickness in the side regions.

3. The composite article of claim 1 wherein:
   the plurality of fibers are positioned in side-by-side arrangement such that the side surface of at least one of the fibers is substantially parallel to the side surface of an immediately adjacent one of the fibers.

4. The composite article of claim 1 wherein:
   the upper and lower surfaces each having a notch region; and
   the notch region in the upper surface of at least one fiber being generally aligned with the notch region in the lower surface of the fiber.

5. The composite article of claim 1 wherein:
   the side surfaces of at least one of the fibers are oriented in non-perpendicular relation to at least one of the upper and lower surfaces of the fiber.

6. The composite article of claim 1 wherein:
the notch region includes an opposing pair of notch sidewalls; and
at least one of the notch sidewalls being oriented in non-perpendicular relation to at least one of the upper and lower surfaces of the fiber.

7. The composite article of claim 1 wherein:
the fiber has a cross section with an aspect ratio of fiber width to fiber thickness; and
the aspect ratio being in the range of from approximately 3 to approximately 500.

8. The composite article of claim 1 wherein:
the fiber comprises a substantially optically transparent fiber; and
the matrix comprising a substantially optically transparent polymeric matrix.

9. The composite article of claim 1 wherein at least one of the matrix and the fiber is formed from at least one of the following:
a thermoplastic material comprising at least one of the following: acrylics, fluorocarbons, polyamides, polyethylenes, polyesters, polypropylenes, polycarbonates, polyurethanes, polyetheretherketone, polyetherketoneketone, polyetherimides;
a thermoset comprising at least one of the following: polyurethanes, phenolics, polyimides, bismaleimides, polyesters, epoxy, silsesquioxanes;
inorganic materials comprising at least one of the following: carbons, silicon carbide, and boron; and
glass comprising E-glass (alumino-borosilicate glass), S-glass (alumino silicate glass), pure silica, borosilicate glass, optical glass.

10. The composite article of claim 1 wherein the composite article is configured as at least one of the following:
a windshield, a canopy, a window, a membrane, a structural panel, an architectural panel, a non-structural article.

11. A fiber that can be configured into a complete article including a windshield, a canopy or a window comprising:
upper, lower and side surfaces;
at least one of the upper and lower surfaces having a notch region and a pair of side regions on opposite sides of the notch region;
the notch region being configured to receive the side region of an adjacent fiber of a different layer to form a coupled layer pair; and wherein an upper surface of the fiber of the coupled layer pair is above an upper surface of the adjacent fiber of the coupled layer pair.

12. The fiber of claim 11 wherein:
the notch region includes an opposing pair of notch sidewalls; and
at least one of the notch sidewalls being oriented in non-perpendicular relation to at least one of the upper and lower surfaces of the fiber.

13. The fiber of claim 11 wherein:
the upper and lower surfaces each having a notch region; and
the notch region in the upper surface of at least one fiber being generally aligned with the notch region in the lower surface of the fiber.

14. The fiber of claim 11 wherein:
the side surfaces of at least one of the fibers are oriented in non-perpendicular relation to at least one of the upper and lower surfaces of the fiber.

15. A method of manufacturing a composite article, comprising the steps of:
forming a plurality of fibers with upper, lower and side surfaces;
forming a notch region and a pair of side regions on opposite sides of the notch region in at least one of the upper and lower surfaces of the fibers;
arranging the plurality of fibers in layers;
receiving the side region of one of the fibers of one of the layers within the notch region of another one of the fibers of an adjacent one of the layers to form a coupled layer pair; and wherein an upper surface of the fiber of the coupled layer pair is above an upper surface of the adjacent fiber of the coupled layer pair.

16. The method of claim 15 further comprising the step of:
receiving a pair of side regions of a corresponding pair of fibers within the notch region.

17. The method of claim 15 further comprising the step of:
forming the notch region in both of the upper and lower surfaces.

18. The method of claim 15 further comprising the step of:
positioning a plurality of the fibers in side-by-side arrangement such that the side surface of at least one of the fibers is substantially parallel to the side surface of an immediately adjacent one of the fibers.

19. The method of claim 15 further comprising the step of:
forming notch sidewalls of the notch region at a non-perpendicular angle relative to at least one of the upper and lower surfaces of the fiber.

20. A method of manufacturing a composite article, comprising the steps of:
forming a plurality of fibers with upper, lower and side surfaces;
forming a notch region and a pair of side regions on opposite lateral sides of the notch region in at least one of the upper and lower surfaces of the fibers;
arranging the plurality of fibers in layers;
receiving a pair of side regions of a corresponding pair of fibers of one of the layers within the notch region of one of the fibers of an adjacent one of the layers to form a coupled layer pair wherein an upper surface of the fiber of the coupled layer pair is above an upper surface of the adjacent fiber of the coupled layer pair;
positioning a plurality of the fibers in side-by-side arrangement such that the side surface of at least one of the fibers is substantially parallel to the side surface of an immediately adjacent one of the fibers;
at least partially embedding the fibers in a matrix; and
at least one of curing and solidifying the matrix to form the composite article.

* * * * *